INVENTOR
Francis D. Kaiser

United States Patent Office 3,440,516
Patented Apr. 22, 1969

3,440,516
TRANSFORMER AND CAPACITOR APPARATUS
FOR THREE-PHASE ELECTRICAL SYSTEMS
Francis D. Kaiser, Sharon, Pa., assignor to Westinghouse
Electric Corporation, Pittsburgh, Pa., a corporation of
Pennsylvania
Continuation-in-part of application Ser. No. 393,169,
Aug. 31, 1964. This application July 11, 1966, Ser.
No. 564,147
Int. Cl. H02m 1/12; H02p 13/04
U.S. Cl. 321—9                                    9 Claims

ABSTRACT OF THE DISCLOSURE

Electrical apparatus for three-phase operation, including a transformer and a three-phase capacitor bank. The transformer includes first, second and third windings connected serially in the three phases of an electrical power system, respectively, a three-phase delta connected winding, and a three-phase zig-zag connected winding. The three-phase capacitor bank is connected to the three-phase zig-zag connected winding, to eliminate the third harmonic in the magnetizing current, which reduces capacitor current during a system line-to-ground fault by at least one-third, and reduces the incidence of ferro-resonance, which often occurs at the third harmonic.

Cross reference to related application

This is a continuation-in-part of application Ser. No. 393,169, filed Aug. 31, 1964, now abandoned, and assigned to the same assignee as the present application.

Background of the invention

This invention relates in general to apparatus for reducing or improving voltage regulation in electrical power systems, and more particularly to apparatus which utilizes series connected capacitors to improve voltage regulation.

Series connected capacitors, because of their automatic and almost instantaneous response, are excellent for reducing voltage fluctuations in electrical power systems due to sudden application of low power factor loads. The negative or capacitive reactance of the series connected capacitors compensates for the inductive reactance of the system or source, and thus eliminates or reduces the reactive voltage drop. In many applications, because of the high voltage of the electrical system, it would be desirable for economic reasons to couple the series connected capacitors into the electrical power system through a series connected transformer, thus allowing the use of lower voltage capacitors. The use of series connected transformers for coupling series connected capacitors into an electrical power system has been limited, however, due to unsatisfactory protective means for the capacitors upon system faults, or due to ferroresonance developing in the transformer-capacitor circuit, or both.

It would also be desirable to provide new and improved apparatus and arrangements for satisfactorily coupling series connected capacitors into the secondary or valve winding of the converter transformer of static converters, to reduce the commutation angle of the converter.

Accordingly, it is an object of this invention to provide new and improved apparatus for reducing voltage fluctuation and improving voltage regulation in electrical power systems.

Another object of the invention is to provide new and improved apparatus utilizing series connected capacitors for reducing voltage regulation in electrical power systems.

A further object of the invention is to provide new and improved electrical apparatus to compensate for low power factor loads in electrical power systems, including series connecting capacitors and a series connected transformer.

Another object of the invention is to provide new and improved series capacitance-transformer apparatus for improving voltage regulation in electrical power systems, which reduces capacitor current during system line-to-ground faults, and which eliminates or substantially reduces ferroresonance.

Still another object of the invention is to provide a new and improved series capacitor-transformer arrangement for reducing the commutation angle in static converters.

Summary of the invention

Briefly, the present invention accomplishes the above cited objects by utilizing a multi-winding series transformer system for coupling series connected capacitors into a three-phase electrical power system, which greatly simplifies the protective problems and reduces or eliminates ferroresonance. The multi-winding series transformer system, which may comprise three separate single-phase magnetic cores, or one three-phase magnetic core, includes a series winding for connection with the three-phase power system, an interconnected zig-zag winding for connection to the capacitors, and a closed delta tertiary winding.

This arrangement produces several important phase balancing characteristics which make it desirable for the series transformation application with series capacitors. It eliminates the third harmonic or zero sequence current and, thus reduces capacitor current during system line-to-ground faults by at least one-third. Further, since ferroresonance usually develops in a conventional series coupled bank of capacitors due to resonance developing at the third or fifth harmonic, the elimination of the third harmonic by the zig-zag winding and closed delta tertiary winding substantially reduces the incidence of ferroresonance. Also, the phase balancing characteristics of the zig-zag interconnection of phase windings also reduces the incidence of ferroresonance.

Brief description of the drawings

Further objects and advantages of the invention will become more apparent when considered in view of the following detailed description and drawings, in which.

Description of preferred embodiments

Figure 1:
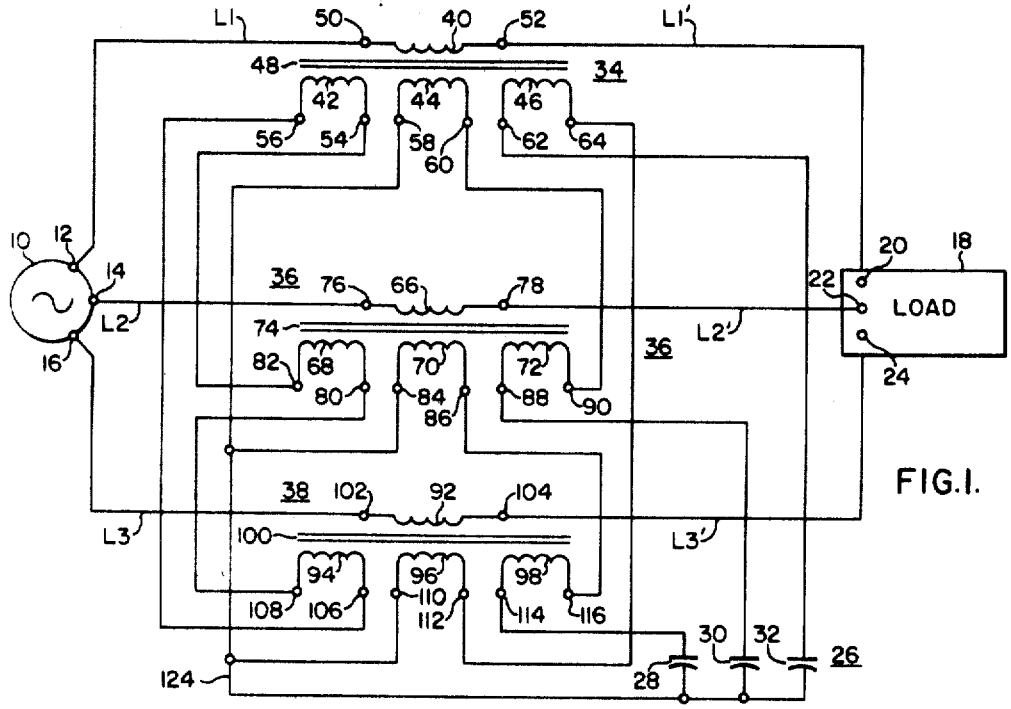
FIGURE 1 is a schematic diagram of transformer and capacitor apparatus illustrative of the invention.

Referring now to the drawings and FIG. 1 in particular, there is illustrated a source 10 of three-phase alternating potential having output terminals 12, 14 and 16 connected to line conductors L1, L2 and L3, respectively. Line conductors L1', L2' and L3' are connected to terminals 20, 22 and 24, respectively of load circuit 18.

In order to compensate for load voltage changes and fluctuations which are caused by fluctuating loads having lagging power factors and the addition of lagging power factor loads to the load circuit 18, it is desirable to connect three-phase capacitor bank 26, represented by capacitors 28, 30 and 32, in series circuit relation with the source potential 10 and the load circuit 18. The negative or capacitive reactance of the series capacitor bank 26 offsets or reduces the circuit voltage drop due to inductive reactance, reducing or improving the system voltage regulation and "stiffening" the system electrically. In other words, the addition of low power factor loads to the system will not cause the same voltage drop if the system has series connected capacitors, that it would without them, eliminating or substantially reducing light flicker, and enabling larger motors to be started across-the-line without requiring the more costly reduced voltage type starters.

However, instead of connecting capacitor bank 26 directly in series circuit relation with line conductors L1, L2 and L3, it is more economical to use low voltage capacitors when the system voltage is high, and couple the low voltage capacitors into the higher voltage electrical system with a series transformer. With all of the economic advantages of this arrangement, however, the use of this arrangement has been limited due to the high incidence of ferroresonance, which produces abnormally large and distorted exciting currents. One of the reasons for the high incidence of the phenomenon of ferroresonance, which occurs when a saturable inductance, such as a transformer, is connected in series circuit relation with a capacitance, is the third harmonic of the exciting currents. If the third harmonic of the excitation current could be eliminated, the incidence of ferroresonance would be substantially reduced.

Another reason limiting the use of the series transformer-capacitor arrangement is the high capacitor current that flows when system line-to-ground faults occur. These disadvantages are overcome when using the multi-winding series transformer arrangement shown in FIG. 1.

More specifically, three single-phase transformers 34, 36 and 38 may be used, or transformers 34, 36 and 38 may represent winding legs of a three-phase core-form, or a three-phase shell-form transformer, with each transformer having a plurality of windings. Transformer 34 has windings 40, 42, 44 and 46 disposed in inductive relation with magnetic core 48. Winding 40 has terminals 50 and 52, winding 42 has terminals 54 and 56, winding 44 has terminals 58 and 60, and winding 46 has terminals 62 and 64.

In like manner, transformer 36 has windings 66, 68, 70 and 72 disposed in inductive relation with magnetic core 74, with winding 66 having terminals 76 and 78, winding 68 having terminals 80 and 82, winding 70 having terminals 84 and 86, and winding 72 having terminals 88 and 90.

Similarly, transformer 38 has windings 92, 94, 96 and 98 disposed in inductive relation with magnetic core 100, with winding 92 having terminals 102 and 104, winding 94 having terminals 106 and 108, winding 96 having terminals 110 and 112, and winding 98 having terminals 114 and 116.

Figure 1A:
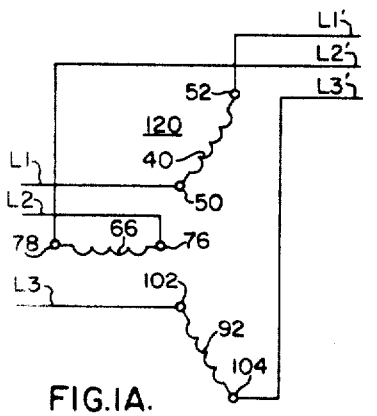
FIGS. 1A, 1B, and 1C are schematic representations of the series, zig-zag, and tertiary windings, respectively, shown in FIG. 1.

The series winding 120, best shown in FIG. 1A, for series connection with the source potential 10 and load circuit 18, includes windings 40, 66 and 92, with winding 40 having its terminals 50 and 52 connected in series circuit relation with line conductors L1 and L1', winding 66 having its terminals 76 and 78 connected in series circuit relation with line conductors L2 and L2', and winding 92 having its terminals 102 and 104 connected in series circuit relation with line conductors L3 and L3'.

Figure 1B:
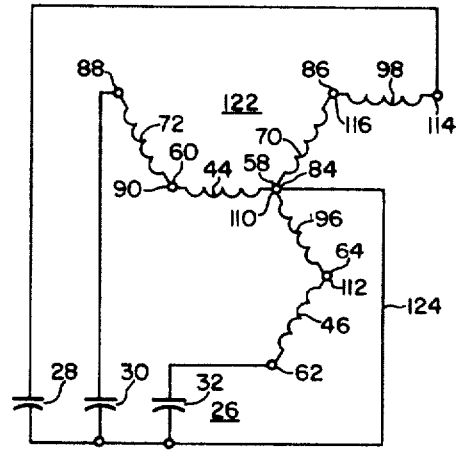

The capacitor means or capacitor bank 26 is electrically coupled with series windings 40, 66 and 92 through zig-zag winding 122, best shown in FIG. 1B. Zig-zag winding 122 is a three-phase winding, in which each phase has two windings, each from a different transformer, or different legs of a three-phase transformer, and each having substantially the same voltage magnitude. More specifically, one phase of zig-zag winding 122 has winding 70 from transformer 36 connected to winding 98 from transformer 38, with terminals 86 and 116 being connected together. Another phase has winding 44 from transformer 34 connected to winding 72 of transformer 36, with terminals 60 and 90 being connected together. The third phase has winding 96 from transformer 38 connected to winding 46 of transformer 34, with terminals 112 and 64 being connected together. A three-phase Y arrangement is formed by connecting terminals 84, 58 and 110 in common, to form the neutral. Capacitor bank 26 is connected to zig-zag winding 122, with the capacitors represented by capacitance 28 being connected to terminal 114 of winding 98, capacitance 30 being connected to terminals 88 of winding 72, and capacitance 32 being connected to terminal 62 of winding 46. The capacitor bank 26 may be connected in Y, as shown, or in delta. If connected in Y, the neutral of the capacitor bank 26 may be connected to the neutral of the zig-zag winding 122 through conductor 124, as shown, or it may be isolated, and/or grounded, depending upon the system requirements. The zig-zag winding 122 has several important advantages when connected in the series transformer arrangement of FIG. 1. First, the zig-zag connection eliminates the third harmonic or zero sequence in the magnetizing current and, therefore, reduces capacitor current during a system line-to-ground fault by a factor of at least one-third. This elimination of the third harmonic in the magnetizing current is due to the phase balancing characteristics of the zig-zag winding 122, as the current in one section of a zig-zag phase flows in a direction opposite to that flowing in the phase coupled to the same core. This may be more easily understood from FIG. 2, which is similar to the circuit shown in FIG. 1, except the plurality of transformer windings are shown wound on pictorial magnetic cores. Like reference numerals in FIGS. 1 and 2, as well as in the remaining figures, refer to like components.

The elimination of the third harmonic in the magnetizing current also eliminates or substantially reduces the incidence of ferroresonance. Ferroresonance usually originates in a conventional series coupled capacitor bank due to resonance developing at the third or fifth harmonic of the magnetizing current. Since the zig-zag winding 122 effectively eliminates the third harmonic in the capacitor bank 26, the incidence of ferroresonance is reduced accordingly. The phase balancing characteristics of the zig-zag interconnection of phases also reduces the incidence of ferroresonance.

Figure 1C:
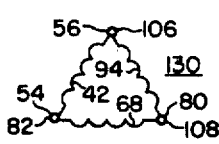

The elimination of the third harmonic in the magnetizing current, however, produces large third harmonic voltages. When the third harmonic in the magnetizing current is eliminated the flux wave becomes flat and contains a strong third harmonic in addition to the fundamental. Thus, large third harmonic voltages are induced in the individual windings of the zig-zag connection. The third harmonic does not appear between the line terminals and the neutral, since the third harmonic voltages in the two windings which make up each phase of the zig-zag connection are equal and opposite, thus cancelling each other. These third harmonic voltages, however, do exist in each winding and are objectionable because of the increased stress placed upon the insulation of each winding. These third harmonic voltages in the individual windings of the zig-zag connection may be eliminated, however, by a closed delta tertiary winding. The third harmonic voltages, being in phase (zero sequence) are short circuited by the delta connected tertiary windings. Thus, the purpose of the delta connected tertiary winding 130 shown in FIGS. 1 and 1C, is to eliminate the third harmonic voltages in the individual windings which make up the zig-zag winding 122. More specifically, terminal 54 of winding 42 of transformer 34 is connected to terminal 82 of winding 68 of transformer 36, terminal 80 and winding 68 is connected to terminal 108 of winding 94 of transformer 38, and terminal 106 of winding 94 is connected to terminal 56 of winding 42.

Figure 2:
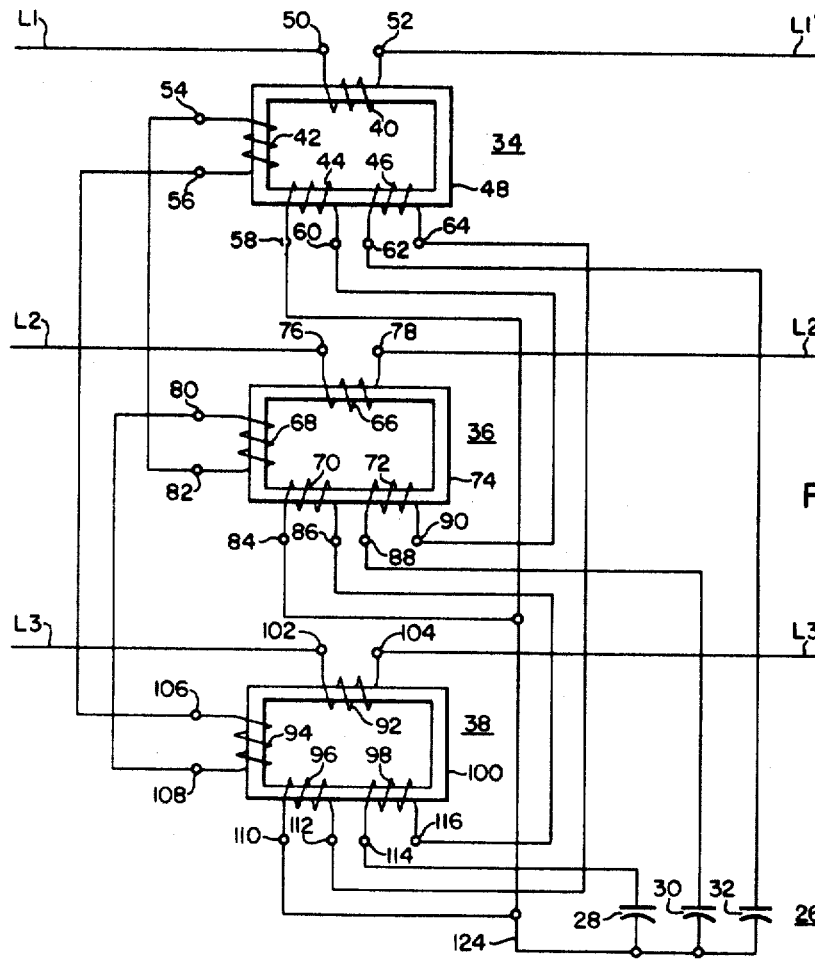
FIG. 2 is a schematic diagram illustrating an embodiment of the invention.

FIG. 2 illustrates the winding arrangement of FIG. 1 where magnetic cores 48, 74 and 100 are separate. If a three-phase magnetic core is utilized, such as a three-phase magnetic core of the core form type, the windings shown in FIG. 1 may be arranged as shown in FIG. 3, with the windings being disposed in inductive relation with three-phase magnetic core 132, with reference numerals 48, 74 and 100 representing the individual legs of magnetic core 132.

Although all of the embodiments have illustrated coupling the series connected capacitors into an electrical system by connecting a series transformer into the electrical distribution lines, the invention is not to be so limited. For example, the series capacitors may be coupled into an electrical system directly at a power transformer. By introducing the series capacitors into an electrical system at a power transformer, certain economies could be realized by designing the series transformer to fit into the same enclosure as the power transformer. This would allow the same coolant and insulating dielectric to be used for both the power and series transformers; separate enclosures for the power and series transformers and long external leads would also be eliminated. An example of this latter embodiment is shown schematically in FIG. 4, in which a source 140 of three-phase alternating potential is connected to a transformer 142, and the transformer 142 is connected to load circuit 144. Transformer 142 comprises a conventional power transformer 143 and a series transformer 145, which may be constructed as shown in FIG. 3, with both being disposed in a common enclosure 260.

More specifically, output terminals 146, 148 and 150 of source potential 140 are connected through line conductors 147, 149 and 151 to terminals 152, 154 and 156, respectively, of primary windings 158, 160 and 162, which have their remaining terminals 164, 166 and 168 connected in common to form a Y connected primary. Secondary windings 170, 172 and 174 may be connected in closed delta, as shown, with terminal 176 of winding 170 being connected to terminal 182 of winding 172, terminal 180 of winding 172 being connected to terminal 186 of winding 174, and terminal 184 of winding 174 being connected to terminal 178 of winding 170. The primary and secondary windings 158, 160 and 162, and 170, 172 and 174, respectively, of power transformer 143 are disposed in inductive relation with a magnetic core 250.

Figure 3:
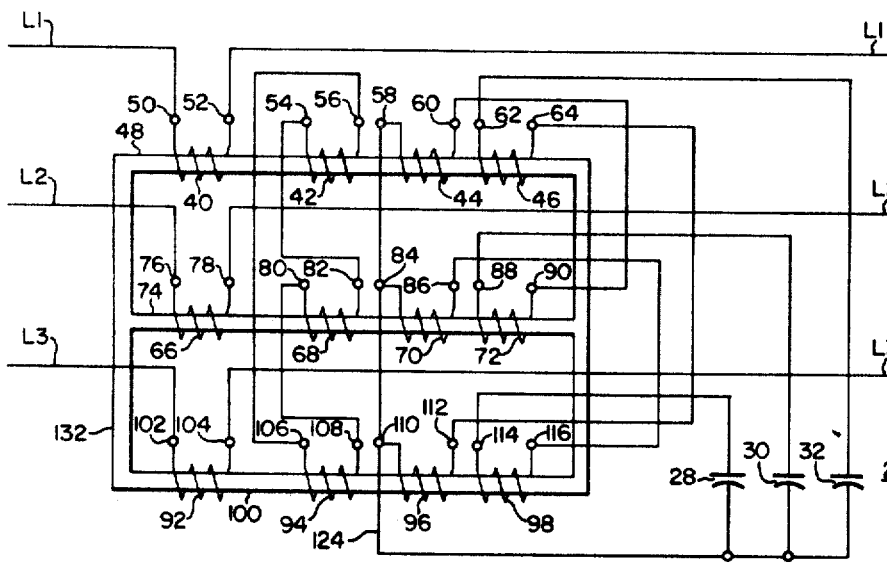
FIG. 3 is a schematic diagram illustrating another embodiment of the invention.

The series transformer 145 has its windings connected according to the teachings of the invention, and are shown disposed on a three-phase magnetic core 100, similar to FIG. 3, hereinbefore described. The secondary windings 170, 172 and 174 of power transformer 143 are connected in series circuit relation with series windings 40, 66 and 92, through conductors 188, 190 and 192, respectively. Series windings 40, 66 and 92 are connected to terminals 194, 196 and 198 of load 144. The connections 188, 190 and 192 between power transformer 143 and series transformer 145 may be made inside the common enclosure 260, eliminating the necessity for long external leads.

Figure 4:
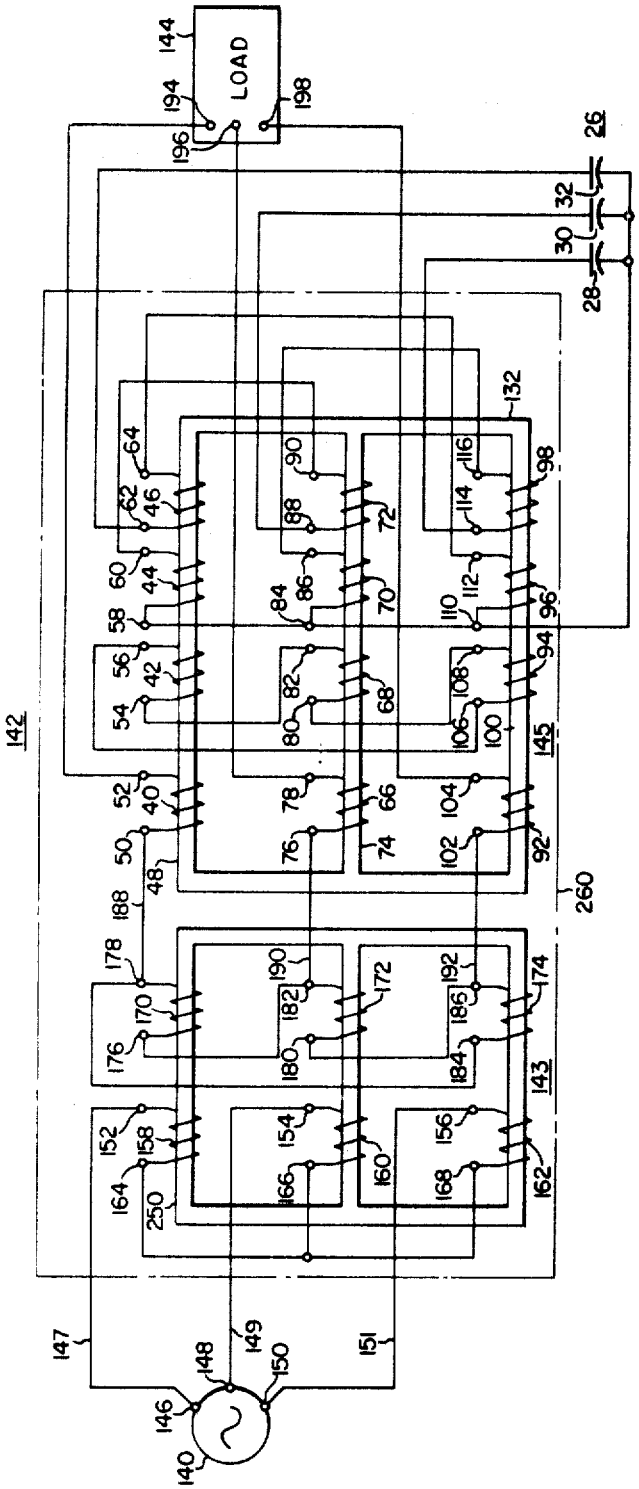
FIG. 4 is a schematic diagram illustrating still another embodiment of the invention.
Figure 4A:
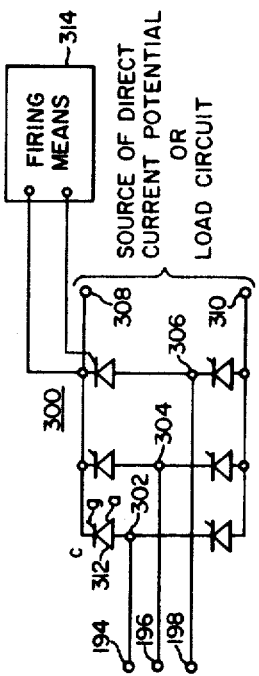
FIG. 4A is a schematic diagram of a static bridge converter which may be used with the embodiment of the invention shown in FIG. 4.

The schematic diagram of FIG. 4, taken with FIG. 4A, may also represent a static converter system, with FIG. 4A schematically illustrating static bridge converter means 300 which may be connected to terminals 194, 196, and 198 of the schematic arrangement shown in FIG. 4. The transformer 143 in FIG. 4, in this instance, would represent the converter transformer, and transformer 145 would represent the series transformer means for coupling capacitor bank 26 into the secondary or valve side of the converter transformer 143. Transformers 143 and 145 may be disposed in the same tank as shown in FIG. 4, or they may be disposed in separate enclosures, and they may be three-phase transformers, as shown in FIG. 4, or they may include a plurality of single phase transformers connected in the desired three-phase configuration.

FIGURE 4A illustrates a static converter three-phase bridge arrangement 300 having alternating current terminals 302, 304 and 306 connected to the three legs of the converter bridge arrangement 300, and direct current terminals 308 and 310. Each leg of the three-phase converter bridge arrangement 300 includes one or more valves, or controllable rectifier devices, such as device 312, connected between each of the alternating current terminals 302, 304 and 306, and each of the direct current terminals 308 and 310. The electrical valves which make up the converter bridge arrangement 300, such as electrical valve 312, may be of the semiconductor type, such as silicon controlled rectifiers, they may be mercury arc type valves, or any type of rectifier means.

Each of the valves, such as valve 312, may have an anode electrode $a$, a cathode electrode $c$, and a control or gate electrode $g$, and each valve may represent a plurality of series and/or parallel connected valve devices, depending upon the voltage and current rating of the bridge arrangement 300, and the voltage and current rating of the valve. Suitable firing means 314, well known in the art, is connected in circuit relation with each of the valves, to control the firing time of the valves according to the desired operation of the converter bridge arrangement 300.

The converter system shown in FGS. 4 and 4A may be controlled to allow power flow in either direction, such as would be required in a high voltage direct current transmission system. In a high voltage direct current transmission system, one end of the transmission line would utilize the converter system as a rectifier, and the other end of the transmission line would utilize the converter system as an inverter. For example, terminals 146, 148 and 150 may be connected to a source 140 of alternating potential, and converter bridge 300, acting as a rectifier, would deliver a direct current potential to terminals 308 and 310. In this instance, firing means 314 may be made responsive to some electrical quantity, such as voltage, current, or power, to regulate the firing time of valve 312 in response thereto. Or, if the bridge arrangement 300 is to only be operated as a rectifier, and firing control is not required, the valve, such as valve 312, need not be controllable, with diodes such as semiconductor silicon diodes, being used as the valves.

Further, terminals 146, 148 and 150 may be connected to an alternating current load (not shown) and the converter bridge arrangement 300, acting as an inverter, would have its terminals 308 and 310 connected to a source of direct current potential.

Regardless of the direction of power flow through the converter bridge arrangement 300 and the converter system, the direct current side of the converter system, connected to terminals 308 and 310, cannot supply reactive power. Thus, when the converter bridge arrangement 300 is acting as a rectifier, its power factor is lagging due to commutation time and any delay in firing time introduced by the firing means 314 in controlling a particular electrical quantity. Therefore, in addition to supplying the active power, the alternating current side of the converter system must also supply the reactive power. When the converter system is operating as an inverter, the firing of the valves is advanced in order to complete commutation before voltage zero, thus operating the inverter at a leading power factor. The alternating current side of the inverter system must supply the reactive power required by the inverter.

The reactive power required from the alternating current system, upon either rectifier or inverter operation of the converter system, may be provided by capacitors. By connecting the capacitors on the valve side of the converter transformer, the dicharge of the capacitors improves the power factor of the converter bridge 300 when it is acting as an inverter, by artificially commutating the inverter to reduce the commutation angle. In other words, the capacitors, when connected on the valve side of the converter transformer 143, reduce the commutating reactance, and thus the commutating angle.

The capacitance may be introduced into the valve side of the converter transformer 143 by connecting capacitors serially with the valve winding of the transformer. This arrangement, however, may result in unstable circuit conditions, due to ferroresonance, and since the capacitor voltage is responsive to the magnitude of current flow therethrough, may require capacitors with a high voltage rating. The teachings of this invention may, therefore, be advantageously applied to converter systems, introducing the capacitance into the valve side of the converter transformer via the series transformer arrangement 145 shown in FIG. 4.

With the series transformer arrangement 145, the third harmonic potential is eliminated, which reduces or eliminates ferroresonance. This arrangement also has several other advantages when utilized with a converter system. For example, in addition to minimizing harmonics by reducing the commutating angle when the system is operated as an inverter, which reduces the size of the filter banks required, the zig-zag winding of series transformer 145 provides a low reactance which minimizes the effect of the fifth, seventh and other higher harmonics, further reducing the size and cost of the harmonic filter banks. Therefore, the series transformer arrangement 145, which introduces capacitor bank 26 into the valve side of the converter transformer 143, provides reactive power for the converter system when it is operating either as a rectifier or as an inverter, it stabilizes the system due to the phase balancing characteristics of the zig-zag winding, and it reduces the commutating angle of the system when it is operating as an inverter.

In summary, there has been shown new and improved apparatus for coupling low voltage capacitors into a higher voltage electrical system which has many important advantages. The capacitor current during system line-to-ground faults has been reduced by at least one-third over prior art methods of coupling capacitors into electrical power systems. Further, ferroresonance has been eliminated or substantially reduced due to the phase balancing characteristics of the zig-zag winding and due to the elimination of the third harmonic of the magnetizing current.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A three-phase electrical system comprising a source of electrical potential, a load circuit, first transformer means, and a three-phase capacitor bank, said first transformer means having a plurality of windings including first, second and third series windings, a three-phase zig-zag connected winding, and a three-phase delta connected winding said first, second and third series windings being connected between said source of electrical potential and said load circuit, with each series winding being serially connected in a different phase of the three-phase electrical system, said three-phase zig-zag connected winding being connected to said three-phase capacitor bank.

2. The electrical apparatus of claim 1 wherein the first transformer means includes first, second and third transformers each having at least first, second, third and fourth windings disposed in inductive relation with a magnetic core, the first winding of each of said first, second and third transformers being the first, second and third series windings, the second winding of each of said first, second and third transformers being connected together to form the three-phase delta winding, and the third and fourth windings of each of said first, second and third transformers being interconnected to form the three-phase zig-zag winding.

3. The electrical apparatus of claim 1 wherein the transformer means includes a three-phase transformer having at least first, second, third and fourth windings disposed in inductive relation with each of the first, second and third winding legs of a magnetic core, the first winding of each of said first, second and third winding legs being the first, second and third series windings, the second winding of each of said first, second and third winding legs being connected together to form the three-phase delta winding, the third and fourth windings of each of said first, second and third winding legs being interconnected to form the three-phase zig-zag winding.

4. The electrical apparatus of claim 1 wherein the first transformer means includes a plurality of windings disposed in inductive relation with first and second magnetic core means, said first magnetic core means including a three-phase primary winding connected to the source of electrical potential and a three-phase secondary winding having first, second and third terminals, said second magnetic core means including the first, second and third series windings, the three-phase delta connected winding, and the three-phase zig-zag winding, the first, second and third series windings each having one end connected to the first, second, and third terminals, respectively, of said three-phase secondary winding, and their other ends connected to the load circuit.

5. The electrical apparatus of claim 4 including an enclosure, the first and second magnetic core means being disposed in said enclosure.

6. The electrical apparatus of claim 1 including converter bridge means connected between the source of electrical potential and the load circuit, said converter bridge means having first, second and third alternating current terminals and direct current terminals, and second transformer means having first and second three-phase windings each having first, second and third alternating current terminals, the first, second and third series windings being connected between the first, second and third alternating current terminals of the second winding of said second transformer means and the first, second and third alternating current terminals of said converter bridge means, respectively.

7. The electrical apparatus of claim 6 including means for operating the converter bridge means as a rectifier, with the first three-phase winding of the second transformer means being connected to the source of electrical potential, and the direct current terminals of the converter bridge means being connected to the load circuit.

8. The electrical apparatus of claim 6 including means for operating the converter bridge as an inverter, with the first three-phase winding of the second transformer means being connected to the load circuit, and the direct current terminals of the converter bridge means being connected to the source of electrical potential.

9. A series transformer arrangement for inductively coupling capacitive reactance into a three-phase electrical power system, comprising:

a three-phase electrical power system, including a source of electrical potential and a load circuit, a series transformer having at least first, second, third and fourth electrical windings disposed on each of three different magnetic core legs, said first windings being connected in series with the phases of said three-phase electrical power system, with each being connected in a different phase between the source of electrical potential and the load circuit, said second windings being interconnected in a closed delta configuration,
said third and fourth windings being interconnected in a zig-zag configuration,
and a three-phase capacitor bank,
said three-phase capacitor bank being connected to said zig-zag winding, whereby the phase balancing characteristics of said zig-zag winding eliminate the third harmonic of the series transformer magnetizing current, to reduce the capacitive current flow upon line-to-ground faults, and to reduce the incidence of ferroresonance, and said delta connected winding eliminates third harmonic voltages in the zig-zag winding.

References Cited

UNITED STATES PATENTS

| | | | |
|---|---|---|---|
| 2,488,628 | 11/1949 | Hoeppner | 323—44 X |
| 3,069,615 | 12/1962 | Jensen | 321—5 X |
| 3,290,578 | 12/1966 | Ainsworth | 321—9 |
| 3,295,045 | 12/1966 | Domizi | 321—9 X |

FOREIGN PATENTS 1,275,486  10/1961  France.

JOHN F. COUCH, *Primary Examiner.*

W. H. BEHAR, JR., *Assistant Examiner.*

U.S. Cl. X.R.

323—50, 76, 93